A. B. Crawford. Sheet 1, 2 Sheets.

Straw Carrier.

No. 4,027. Reissued May 31, 1870.

Witnesses.

Chas. B. Burch

Jos. C. Clayton

Inventor.

A. B. Crawford.

N. PETERS, PHOTO-LITHOGRAPHER, WASHINGTON, D. C.

A. B. Crawford. Sheet 2, 2 Sheets

Straw Carrier.

No. 4,007. Reissued May 31, 1870.

Witnesses.

Chas. B. Burch.

Jos. C. Clayton

Inventor.

A. B. Crawford

N. PETERS, PHOTO-LITHOGRAPHER, WASHINGTON, D. C.

UNITED STATES PATENT OFFICE.

JOHN O'FERRALL AND THOMAS L. DANIELS, OF PIQUA, OHIO, ASSIGNEES OF A. B. CRAWFORD.

IMPROVEMENT IN THRASHING-MACHINES.

Specification forming part of Letters Patent No. 29,865, dated September 4, 1860; reissue No. 4,007, dated May 31, 1870.

*To all whom it may concern:*

Be it known that A. B. CRAWFORD, of Piqua, Miami county, in the State of Ohio, invented a new Improvement in Grain Thrashing and Separating Machines; and we do hereby declare that the following is a full, clear, and exact description of the same, reference being had to the accompanying drawings, making a part of this specification, in which—

Figure 1:
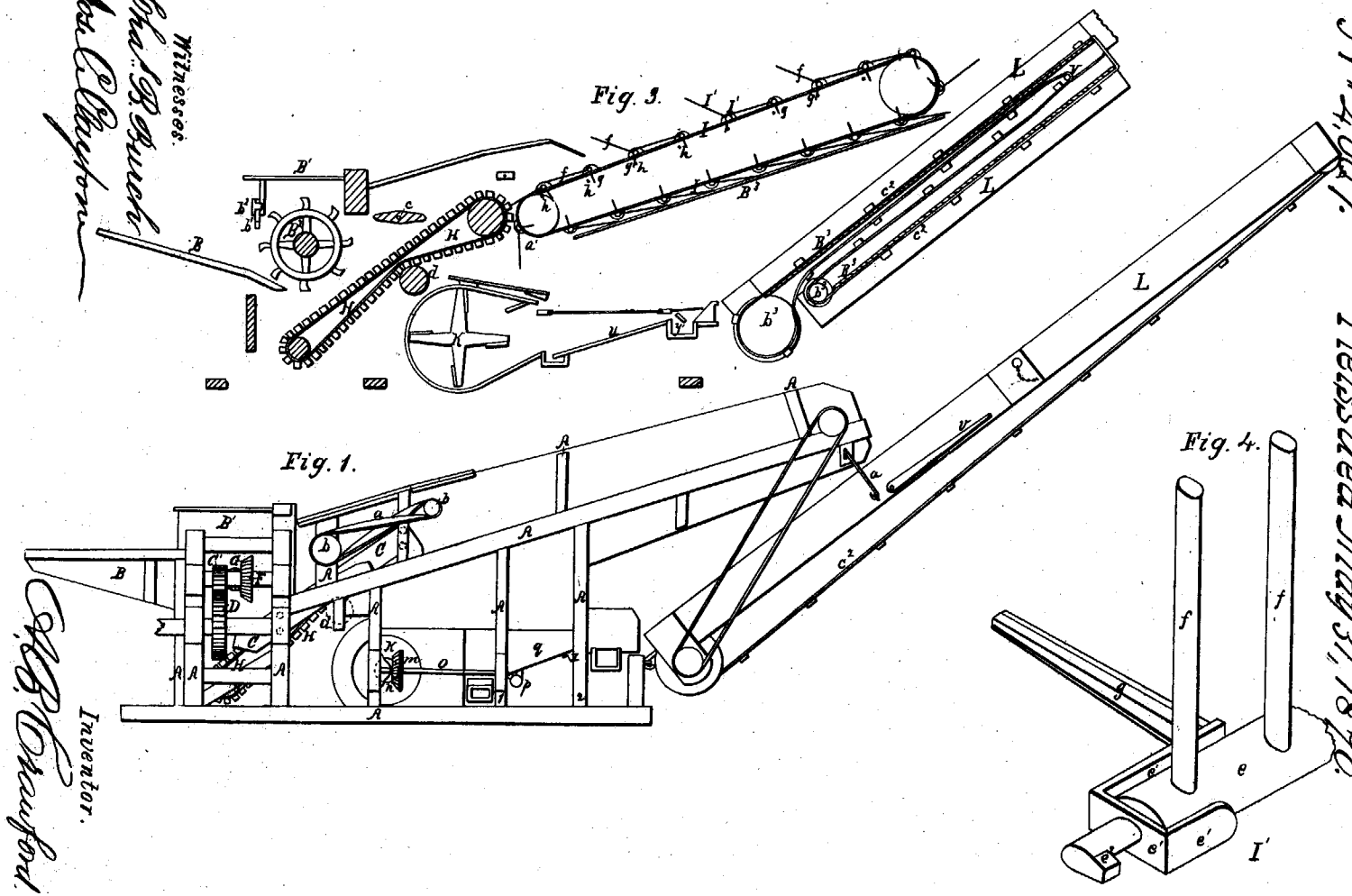
Figure 2:
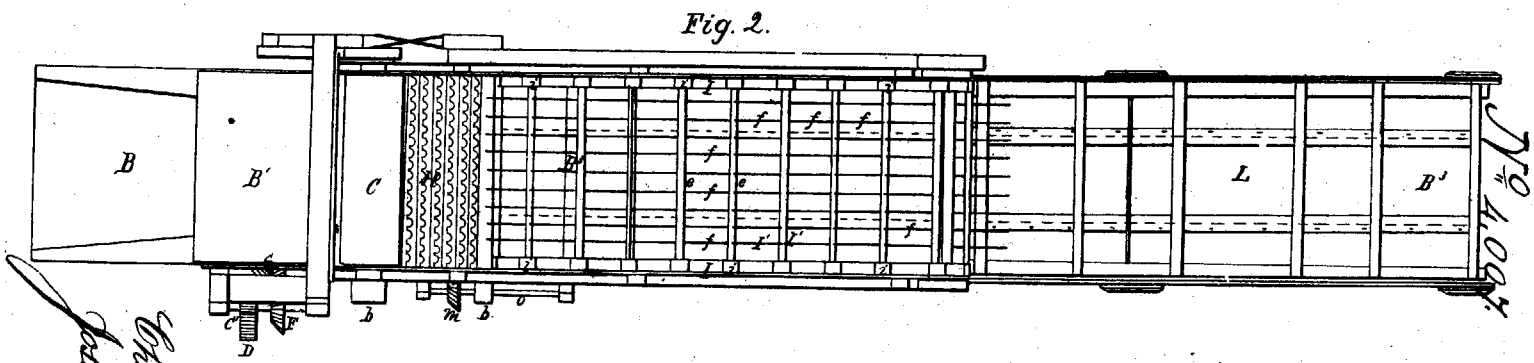
Figure 5:
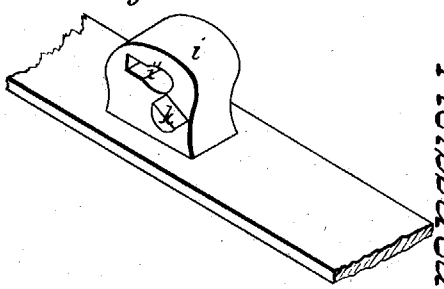
Figure 7:
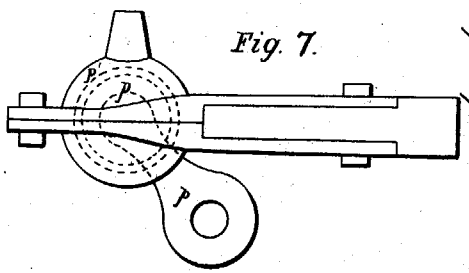
Figure 8:
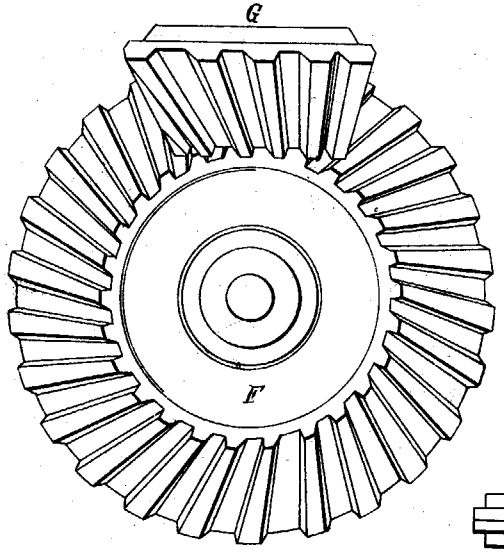
Figure 6:
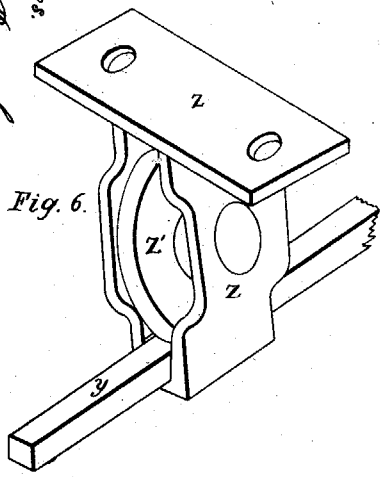

Figure 1 is a side elevation; Fig. 2, a plan view; Fig. 3, a longitudinal section through the line *x x*, Fig. 2; Fig. 4, a view of arm *e*, fingers *f*, tooth *g*, and casting E; Fig. 5, a view of thimble *i;* Fig. 6, a view of caster; Fig. 7, a view of ball-and-socket joint.

One part of the invention of the said CRAWFORD consists in the attachment of a straw-stacker to a thrashing-machine in such a manner that it may be transported from place to place without being detached from the machine.

Another part consists in a straw-stacker made in two or more sections, hinged together in such a manner that the upper section or sections may be extended in line with the lower one, for use in connection with a thrashing-machine, or may be folded under the lower section and secured there safely for transportation without being detached from the machine.

In the drawings, L is the stacker, which may be made with cross-ties extending through the side boards, and secured therein by joint bolts or pins. To the cross-ties a light bottom of plank, $B^3$, is secured. At each end of the stacker is a transverse shaft in suitable boxes, bearing two or three pulleys, by which the carrier $c^2$ is driven, which removes the straw from the machine. The belt $c^3$ is made with two or more longitudinal straps of leather, to which slats are nailed at intervals of fifteen or eighteen inches, so that as the straw and chaff from the thrasher fall upon the belt they can be conveyed to the outer end of the stacker. One of the shafts, either at the upper or lower end of the stacker, protrudes through the sides of the same, and upon this shaft the driving-pulley is placed.

The stacker may be attached to the thrashing-machine in any way that may best suit the shape and style of the latter, or the will of the constructer. The usual way is to attach the lower end of the stacker to the machine, either by putting an iron eye into the sill or back part of the machine, and a hook into the stacker, and passing the hook into the eye, or by lengthening the lower shaft of the stacker, so that it extends about three inches beyond each side, on which projectings ends are journal-boxes constructed with bearings outside of flanges, which screw up against the side of the stacker, said bearings being made to work into boxes formed either on the back part of the machine, or a part attached for the purpose a few inches in the rear of the back part. The upper end of the stacker may be secured to the thrasher by means of hangers *a*, extending down from the arm of the machine, and attached to the stacker on each side by means of bolts. The upper section, when in use, is extended so as to stand in line with the lower section.

When the stacker is folded for transportation, the upper section is brought under and secured to the lower section in any suitable manner. Any kind of hinge that will answer the purpose may be used to connect the sections. The kind generally used is made of cast-iron and bolted to the sections.

The stacker may be driven with either chain or belt, and from either the upper or lower shaft, as may be most convenient.

Having thus described the invention of the said A. B. CRAWFORD, what we claim as new, and desire to secure by Letters Patent, is—

1. The combination, substantially as herein shown, of the folding straw-stacker L with a thrashing-machine, so that the former may be transported from place to place without being detached from the latter, as herein set forth.

2. The straw-stacker *a*, when made in two or more sections, *x x*, hinged together in such manner that the upper section or sections may be extended in line with the lower one, for use in connection with a thrashing-machine, or may be folded under the lower section and secured thereto, so as to be capable of being transported without detachment from the machine.

JOHN O'FERRALL.
THOMAS L. DANIELS.

Witnesses:
HENRY FLESH,
M. H. JONES,
SIMON FLESH.